(12) United States Patent
Fonville

(10) Patent No.: US 7,287,523 B1
(45) Date of Patent: Oct. 30, 2007

(54) THERMALLY RESPONSIVE REGULATOR VALVE ASSEMBLY

(75) Inventor: Carl E. Fonville, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 10 days.

(21) Appl. No.: 11/402,727

(22) Filed: Apr. 12, 2006

(51) Int. Cl.
*F02M 25/07* (2006.01)
*F02B 47/08* (2006.01)

(52) U.S. Cl. .............................. 123/568.18; 123/568.2

(58) Field of Classification Search ............ 123/41.08, 123/41.1, 545, 569.11, 568.18, 568.2, 568.22, 123/568.29; 251/356, 369; 236/1 R, 40
See application file for complete search history.

(56) References Cited

U.S. PATENT DOCUMENTS

| | | | | |
|---|---|---|---|---|
| 2,054,997 A | * | 9/1936 | Vang | 123/545 |
| 2,133,359 A | * | 10/1938 | Miller | 251/356 |
| 3,050,935 A | * | 8/1962 | Eastwood | 60/286 |
| 3,851,633 A | * | 12/1974 | Shih | 123/575 |
| 3,886,918 A | * | 6/1975 | Cole | 123/548 |
| 4,061,265 A | * | 12/1977 | Kitamura | 236/48 R |
| 4,117,813 A | * | 10/1978 | Yamashita et al. | 123/334 |
| 4,441,356 A | * | 4/1984 | Bohl | 73/23.2 |
| 4,450,824 A | * | 5/1984 | Ando et al. | 123/568.22 |
| 5,492,104 A | | 2/1996 | Elder et al. | 123/568 |
| 5,921,224 A | | 7/1999 | Sinnamon | 123/568.21 |
| 6,945,238 B2 | | 9/2005 | Huebler | 123/568.18 |

* cited by examiner

*Primary Examiner*—Willis R. Wolfe, Jr.

(57) ABSTRACT

A thermally responsive regulator valve assembly and exhaust gas recirculation system for an internal combustion engine having an intake manifold and an exhaust system is provided. The exhaust gas recirculation system includes an exhaust gas recirculation passage selectively interconnecting the exhaust system and the intake manifold. An exhaust gas recirculation valve is disposed in fluid communication with the exhaust gas recirculation passage and operates to selectively and variably communicate recirculated exhaust gas to the intake manifold. A thermally responsive regulator valve assembly is disposed at least partially within the exhaust gas recirculation passage and the intake manifold. The thermally responsive valve assembly is sufficiently configured to variably restrict flow of the recirculated exhaust gas from the exhaust gas recirculation passage to the intake manifold when the flow of inlet air within the intake manifold is sufficiently low and/or the temperature of the inlet air is sufficiently high.

13 Claims, 2 Drawing Sheets

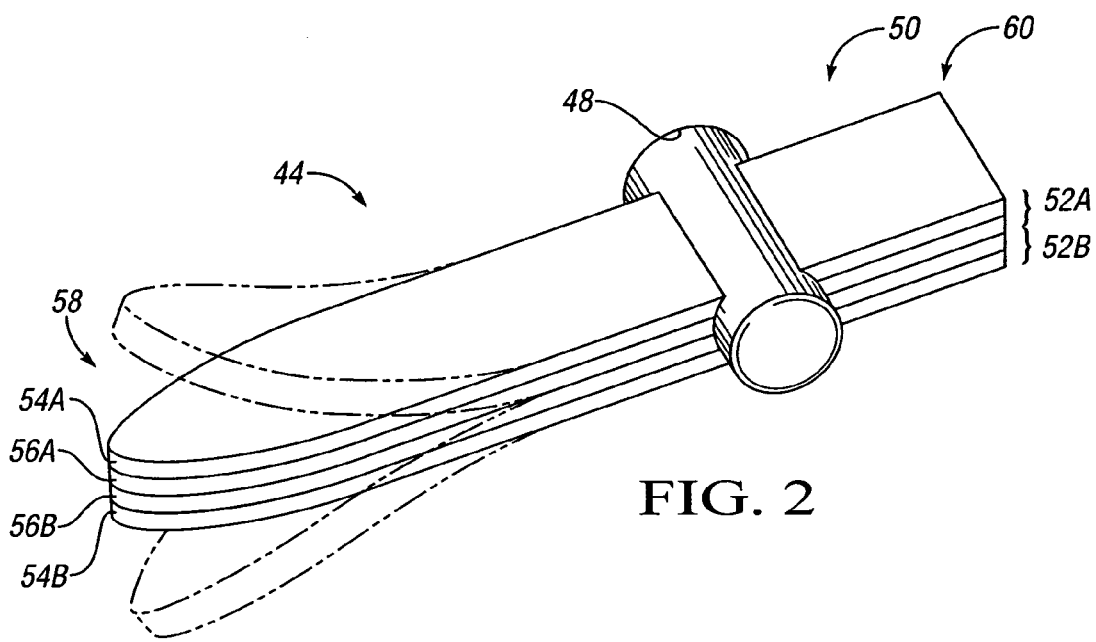
FIG. 2
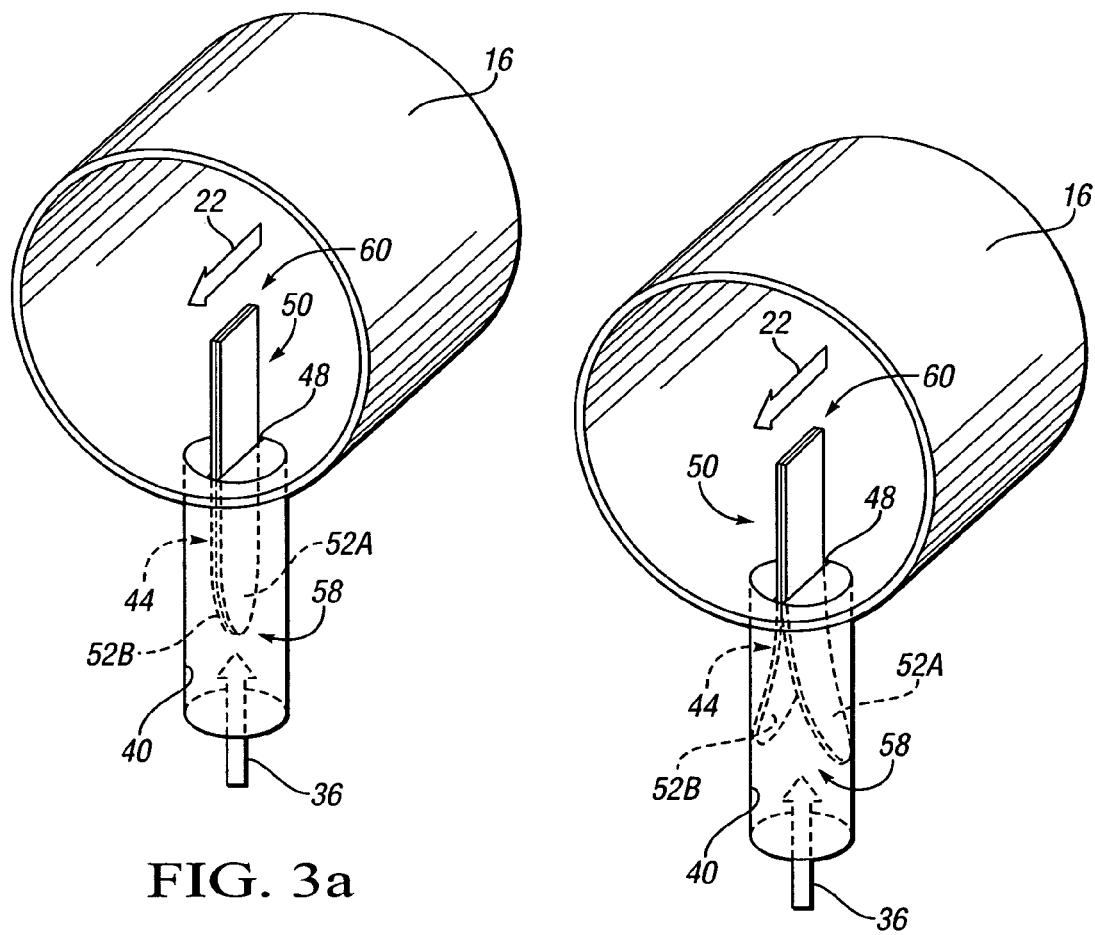
FIG. 3a
FIG. 3b

THERMALLY RESPONSIVE REGULATOR VALVE ASSEMBLY

TECHNICAL FIELD

The present invention relates to thermally responsive flow regulator valves used within an exhaust gas recirculation system for an internal combustion engine.

BACKGROUND OF THE INVENTION

The use of an exhaust gas recirculation, or EGR, system to recirculate exhaust gas from an internal combustion engine to an inlet air path of the engine is well known. By introducing recirculated exhaust gas, or EGR gas, to the inlet air path, the level of certain undesirable engine emission constituents such as oxides of nitrogen (NOx) can be reduced and fuel economy may improve. Up to a limit, NOx emissions decrease with increasing EGR gas levels. Beyond the limit, EGR gas can increase formation of other undesirable engine emission constituents and can reduce vehicle drivability.

Exhaust gas recirculation typically involves recirculation of exhaust gas through an EGR passage between an engine exhaust conduit, such as an exhaust manifold, and a fresh air intake passage, such as an intake manifold. A valve, often referred to as the EGR valve, is typically provided in communication with the EGR passage and is controllable to variably restrict the passage to regulate the flow of exhaust gas therethrough. When EGR gas is not required or desired, the EGR valve is driven to a full restriction (closed) position, typically through a spring preload. The spring preload is commonly required to be substantial, to ensure rapid closing of the EGR valve when necessary, and to ensure proper sealing of the closed EGR valve. When EGR gas is required, the EGR valve is driven to an open position through application of a position control signal to an actuator mechanically linked to the EGR valve. The degree of opening of the EGR valve varies with the magnitude of the position control signal.

With the EGR valve in the open position, EGR gas enters the intake manifold and flows to the engine cylinders. For optimum performance, the EGR gas should thoroughly mix with the inlet air so that each cylinder receives substantially identical proportions of EGR gas. Typically, the EGR gas is supplied to the intake air immediately prior to entering an intake manifold to minimize the response time between the EGR valve opening and EGR gas reaching the engine cylinders and to maximize EGR gas distribution.

Intake manifolds for use in automotive applications have traditionally been manufactured from metallic materials having high temperature durability, such as cast iron, alloys of aluminum, or magnesium. More recently, weight and manufacturing concerns have given rise to the use of thermoplastics on engines. When used in the construction of intake manifolds, weight may be reduced and, in many cases, performance may be improved as a result of precise control of interior finish and reduced heat transfer to the inlet air. Incorporation of the EGR system within thermoplastic intake manifolds is a principle design challenge since EGR gas is typically communicated to the intake manifold at high temperature.

SUMMARY OF THE INVENTION

A thermally responsive regulator valve and an exhaust gas recirculation system incorporating same for an internal combustion engine, having an intake manifold and an exhaust system, is provided. The exhaust gas recirculation system includes an exhaust gas recirculation passage selectively interconnecting the exhaust system and the intake manifold. An exhaust gas recirculation valve is disposed in fluid communication with the exhaust gas recirculation passage and operates to selectively and variably communicate recirculated exhaust gas to the intake manifold. The thermally responsive regulator valve assembly is disposed at least partially within the exhaust gas recirculation passage and the intake manifold. The thermally responsive valve assembly includes a bi-metallic regulator valve member and is sufficiently configured to variably restrict flow of the recirculated exhaust gas from the exhaust gas recirculation passage to the intake manifold when the flow of inlet air within the intake manifold is sufficiently low and/or the temperature of the inlet air is sufficiently high.

The bimetallic regulator valve member may have opposed first and second ends and includes opposed first and second bimetallic strip portions fixed at the second end of the bimetallic regulator valve member. The first and second bimetallic strip portions are movable with respect to each other at the first end of the bimetallic regulator valve member disposed opposite the second end. An internal combustion engine is also provided incorporating the disclosed exhaust gas recirculation system and thermally responsive flow regulator valve assembly.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a perspective view of the thermally responsive flow regulator valve assembly of the present invention;

FIG. 3a is a perspective view of the thermally responsive flow regulator valve assembly of FIG. 2 disposed within the EGR system and shown in an open position; and FIG. 3b is a perspective view of the thermally responsive flow regulator valve assembly of FIG. 2 disposed within the EGR system and shown in a closed position.

DESCRIPTION OF THE PREFERRED EMBODIMENTS

Figure 1:
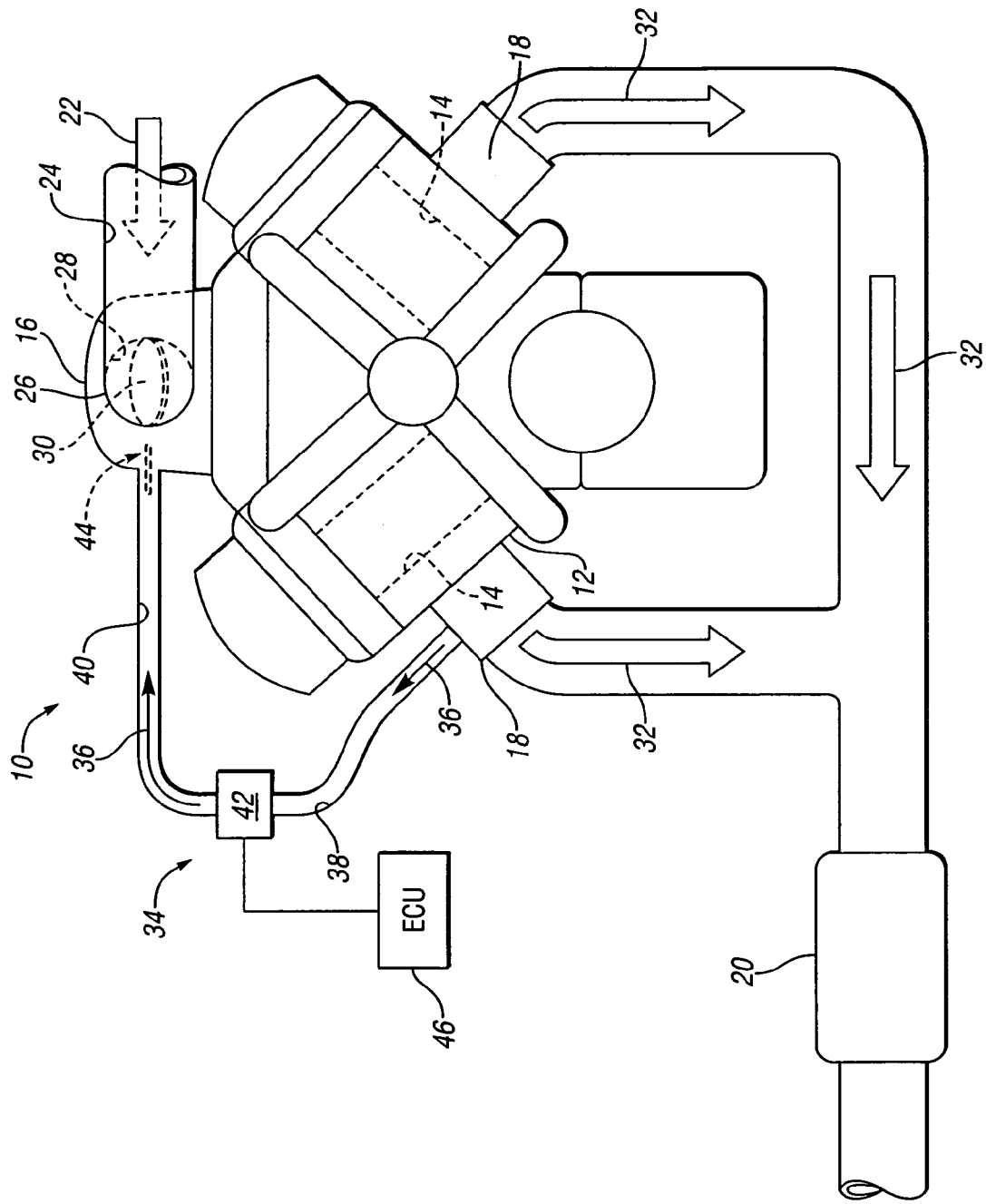
FIG. 1 is a schematic front view of an internal combustion engine having an exhaust gas recirculation, or EGR, system incorporating a thermally responsive flow regulator valve assembly consistent with the present invention.

Referring to the drawings wherein like reference numbers correspond to like or similar components throughout the several figures, there is shown in FIG. 1 an internal combustion engine, generally indicated at 10. The internal combustion engine includes a cylinder block 12, which defines a plurality of cylinders 14. The internal combustion engine 10 further includes an intake manifold 16 and exhaust manifolds 18. The intake manifold 16 is preferably formed from a thermoplastic material, while the exhaust manifolds 18 are preferably formed from a material such as cast stainless steel or cast iron. An exhaust aftertreatment device or catalytic converter 20 is provided in downstream exhaust flow relation to the exhaust manifolds 18.

In operation, the internal combustion engine 10 receives inlet air 22 from an inlet duct 24. The inlet air 22 is selectively and variably admitted to the intake manifold 16 by a throttle body 26. Typically, the throttle body 26 includes a throttle plate 30 rotatably mounted within a bore 28 defined by the throttle body 26. The inlet air 22 is selectively communicated from the intake manifold 16 to the cylinders 14 via poppet valves, not shown. The inlet air 22 is subsequently combusted with fuel within the cylinders 14. The products of combustion or exhaust gases 32 are selectively exhausted from the cylinders 14 via poppet valves, not shown, to the exhaust manifolds 18. The catalytic converter 20 operates to reduce the regulated emission constituents, such as oxides of nitrogen (NOx), from within the exhaust gases 32.

Under certain engine operating conditions such as part load operation, a portion of the exhaust gases 32 may be recirculated through an exhaust gas recirculation, or EGR, system 34 as EGR gas 36. The EGR system 34 includes a first passage 38, a second passage 40, a controllable high temperature resistant valve, or EGR valve 42, and a thermally responsive flow regulator valve assembly 44. The first passage 38 is operable to communicate EGR gas 36 from one or both of the exhaust manifolds 18 to the EGR valve 42. The EGR valve 42 selectively and variably communicates EGR gas 36 to the second passage 40, which is in fluid communication with the thermally responsive flow regulator valve assembly 44. The thermally responsive flow regulator valve assembly 44 operates to selectively communicate EGR gas 36 to the intake manifold 16. It is preferred that the EGR gas 36 is supplied to the intake manifold 16 at a point sufficiently upstream of the cylinders 14, such as immediately downstream from the throttle body 26, to allow sufficient mixing between the EGR gas 36 and the inlet air 22 prior to entering the cylinders 14. The construction and operation of the thermally responsive flow regulator valve assembly 44 will be discussed in greater detail hereinbelow with reference to FIGS. 2, 3, and 4.

The EGR valve 42 is preferably an electromagnetic linear solenoid valve with the degree of opening controlled by signals from an electronic control unit, or ECU 46. The ECU 46 includes a preprogrammable digital computer having a central processing unit, read only memory, random access memory, input/output units, etc. More specifically, ECU 46 provides a pulse width modulated (PWM) position control signal to the EGR valve 42 to control the amount of EGR gas 36 communicated to the intake manifold 16.

Referring to FIG. 2, there is shown a perspective view of the thermally responsive flow regulator valve assembly 44. The thermally responsive flow regulator valve assembly 44 includes a mounting member 48 rigidly mounted to a regulator valve member 50. The regulator valve member 50 is formed from two opposed bimetallic strips 52A and 52B either folded or fastened with respect to each other. The bimetallic strips 52A and 52B are formed from a bimetallic laminate. Those skilled in the art will recognize that bimetallic laminates are laminates having a first layer formed from a metal having a first thermal expansion coefficient bonded or otherwise attached to a second layer of metal having a second thermal expansion coefficient different from that of the first metal. As such, the bimetallic strip 52A includes a first metallic layer 54A and a second metallic layer 56A, while the bimetallic strip 52B a includes a first metallic layer 54B and a second metallic layer 56B. Preferably, the first metallic layers 54A and 54B are formed from metals having the same or similar thermal expansion coefficient, while the second metallic layers 56A and 56B are formed from metals having the same or similar thermal expansion coefficient. Additionally, the second metallic layers 56A and 56B preferably have a greater thermal expansion coefficient than the first metallic layers 54A and 54B. The second metallic layers 56A and 56B are disposed adjacent to each other such that when the thermally responsive flow regulator valve assembly 44 is subject to heat energy, the bimetallic strips 52A and 52B bias or otherwise move apart from one another as shown by phantom lines in FIG. 2.

The mounting member 48 is preferably configured to mount the thermally responsive flow regulator valve assembly 44 at least partially within the second passage 40, shown in FIG. 1, and at least partially within the intake manifold 16, shown in FIG. 1. In assembly, a first end 58 of the thermally responsive flow regulator valve assembly 44 is disposed within the second passage 40, while a second end 60 is disposed within the intake manifold 16. Preferably, the first end 58 of the thermally responsive flow regulator valve assembly 44 is contoured such that the bimetallic strips 52A and 52B sealingly engage the second passage 40, having a generally circular cross section, when biased apart from one another.

Referring now to FIGS. 3a and 3b and with continued reference to FIGS. 1 and 2, there is shown in FIGS. 3a and 3b a portion of the internal combustion engine 10 illustrating the placement of the thermally responsive flow regulator valve assembly 44 of the present invention within the EGR system 34. The thermally responsive flow regulator valve assembly 44 is shown in an open position in FIG. 3a, while FIG. 3b shows the thermally responsive flow regulator valve assembly 44 in a closed position. With the thermally responsive flow regulator valve assembly 44 in the open position EGR gas 36 may be communicated substantially unrestricted from the second passage 40 to the intake manifold 16. Alternately, with the thermally responsive flow regulator valve assembly 44 in the closed position the flow of EGR gas 36 from the second passage 40 to the intake manifold 16 is substantially restricted.

The thermally responsive flow regulator valve assembly 44 operates to protect the intake manifold 16 from high temperature excursions by selectively blocking the flow of EGR gas 36 into the intake manifold 16. Referring to FIG. 3a, the EGR gases 36 operate to heat the first end 58 of the thermally responsive flow regulator valve assembly 44 as the EGR gases 36 flow into the intake manifold 16. However, the flow of inlet air 22 is sufficiently high and/or the temperature of the inlet air is sufficiently low to effect cooling of the second end 60 of the thermally responsive flow regulator valve assembly 44. As such, the temperature of the first end 58 does not reach a temperature sufficient to cause the bimetallic strips 52A and 52B to bias away from each other.

A shown in FIG. 3b, the EGR gas 36 continues to heat the first end 58 of the thermally responsive flow regulator valve assembly 44. Should the flow rate of the inlet air 22 be reduced or the temperature of the inlet air 22 is sufficiently high to allow heating of the thermally responsive flow regulator valve assembly 44, the first end 58 may reach a temperature sufficient to cause the bimetallic strips 52A and 52B to bias away form each other. The bimetallic strips 52A and 52B, as described hereinabove, operate to seal the second passage 40 thereby substantially blocking the flow of EGR gas 36 to the intake manifold 16. Such a condition may manifest if the EGR valve 42 fails in the open position. The thermally responsive flow regulator valve assembly 44 operates as a safeguard to avoid over heating the intake manifold 16, which could lead to loss of clamp load of the mounting fasteners, not shown, resulting in loss of sealing or warping of the intake manifold 16. Although the first end 58, as shown in FIGS. 2, 3a, and 3b, is configured to sealingly engage a second passage 40 having a generally circular cross section, those skilled in the art will readily recognize that the present invention may be applied to second passages 40 having other cross sections, such as square cross sections, while remaining within the scope of that which is claimed.

While the best modes for carrying out the invention have been described in detail, those familiar with the art to which this invention relates will recognize various alternative designs and embodiments for practicing the invention within the scope of the appended claims.

The invention claimed is:

1. A thermally responsive flow regulator valve assembly for regulating the flow of recirculated exhaust gas from a passage into an intake manifold containing at least air, the thermally responsive flow regulator valve assembly comprising:
   a bi-metallic regulator valve member movable in response to temperature and disposed at least partially within each of the passage and the intake manifold;
   wherein the bi-metallic regulator valve member is sufficiently configured to variably restrict flow of the recirculated exhaust gas from the passage to the intake manifold when the flow of the air within the intake manifold is sufficiently low and/or the temperature of the recirculated exhaust gas is sufficiently high; and
   a mounting member sufficiently configured to mount said bi-metallic regulator valve member at least partially within each of the passage and intake manifold.

2. The thermally responsive regulator valve assembly of claim 1, wherein said bimetallic regulator valve member has opposed first and second ends and includes opposed first and second bimetallic strip portions fixed at said second end of said bimetallic regulator valve member, and wherein said first and second bimetallic strip portions are movable with respect to each other at said first end of said bimetallic regulator valve member disposed opposite said second end.

3. The thermally responsive regulator valve assembly of claim 2, wherein said first end of said bimetallic strip member is sufficiently configured to selectively seal the passage.

4. An exhaust gas recirculation system for an internal combustion engine having an intake manifold and an exhaust system, the exhaust gas recirculation system comprising:
   an exhaust gas recirculation passage selectively interconnecting the exhaust system and the intake manifold;
   an exhaust gas recirculation valve disposed in fluid communication with said exhaust gas recirculation passage and operable to selectively and variably communicate recirculated exhaust gas to the intake manifold;
   a thermally responsive regulator valve assembly disposed at least partially within said exhaust gas recirculation passage and the intake manifold; and
   wherein said thermally responsive valve assembly is sufficiently configured to variably restrict flow of said recirculated exhaust gas from said exhaust gas recirculation passage to the intake manifold when the flow of inlet air within the intake manifold is sufficiently low and/or the temperature of said inlet air is sufficiently high.

5. The exhaust gas recirculation system of claim 4, wherein said thermally responsive regulator valve assembly includes:
   a bimetallic regulator valve member movable in response to temperature and disposed at least partially within each of said exhaust gas recirculation passage and the intake manifold; and
   wherein the bimetallic regulator valve member is sufficiently configured to variably restrict flow of said recirculated exhaust gas from said exhaust gas recirculation passage to the intake manifold when the flow of said inlet air within the intake manifold is sufficiently low and/or the temperature of the said inlet air is sufficiently high.

6. The exhaust gas recirculation system of claim 5, wherein said thermally responsive regulator valve assembly includes a mounting member sufficiently configured to mount said bimetallic regulator valve member at least partially within each of said exhaust gas recirculation passage and the intake manifold.

7. The exhaust gas recirculation system of claim 5, wherein said bi-metallic regulator valve member has opposed first and second ends and includes opposed first and second bi-metallic strip portions fixed at said second end of said bimetallic regulator valve member, and wherein said first and second bimetallic strip portions are movable with respect to each other at said first end of said bimetallic regulator valve member disposed opposite said second end.

8. The exhaust gas recirculation system of claim 7, wherein said first end of said bimetallic valve member is sufficiently configured to selectively seal said exhaust gas recirculation passage.

9. An internal combustion engine comprising:
   an intake manifold operable to communicate inlet air to the internal combustion engine;
   an exhaust system operable to communicate exhaust gases away from the internal combustion engine;
   an exhaust gas recirculation system operable to communicate recirculated exhaust gas from said exhaust system to said intake manifold, said exhaust gas recirculation system including:
      an exhaust gas recirculation passage selectively interconnecting said exhaust system and said intake manifold;
      an exhaust gas recirculation valve disposed in fluid communication with said exhaust gas recirculation passage and operable to selectively and variably communicate said recirculated exhaust gas to said intake manifold;
      a thermally responsive regulator valve assembly disposed at least partially within said exhaust gas recirculation passage and said intake manifold; and
      wherein said thermally responsive valve assembly is sufficiently configured to variably restrict flow of said recirculated exhaust gas from said exhaust gas recirculation passage to said intake manifold when the flow of said inlet air within said intake manifold is sufficiently low and/or the temperature of said inlet air is sufficiently high.

10. The internal combustion engine of claim 9, wherein said thermally responsive regulator valve assembly includes:
   a bimetallic regulator valve member movable in response to temperature and disposed at least partially within each of said exhaust gas recirculation passage and the intake manifold; and
   wherein the bimetallic regulator valve member is sufficiently configured to variably restrict flow of said recirculated exhaust gas from said exhaust gas recirculation passage to said intake manifold when the flow of said inlet air within said intake manifold is sufficiently low and/or the temperature of the said inlet air is sufficiently high.

11. The internal combustion engine of claim 10, wherein said thermally responsive regulator valve assembly includes a mounting member sufficiently configured to mount said bimetallic regulator valve member at least partially within each of said exhaust gas recirculation passage and said intake manifold.

12. The internal combustion engine of claim 10, wherein said bi-metallic regulator valve member has opposed first and second ends and includes opposed first and second bi-metallic strip portions fixed at said second end of said bimetallic regulator valve member, and wherein said first and second bimetallic strip portions are movable with respect to each other at said first end of said bimetallic regulator valve member disposed opposite said second end.

13. The internal combustion engine of claim 12, wherein said first end of said bi-metallic valve member is sufficiently configured to selectively seal said exhaust gas recirculation passage.

* * * * *